UNITED STATES PATENT OFFICE.

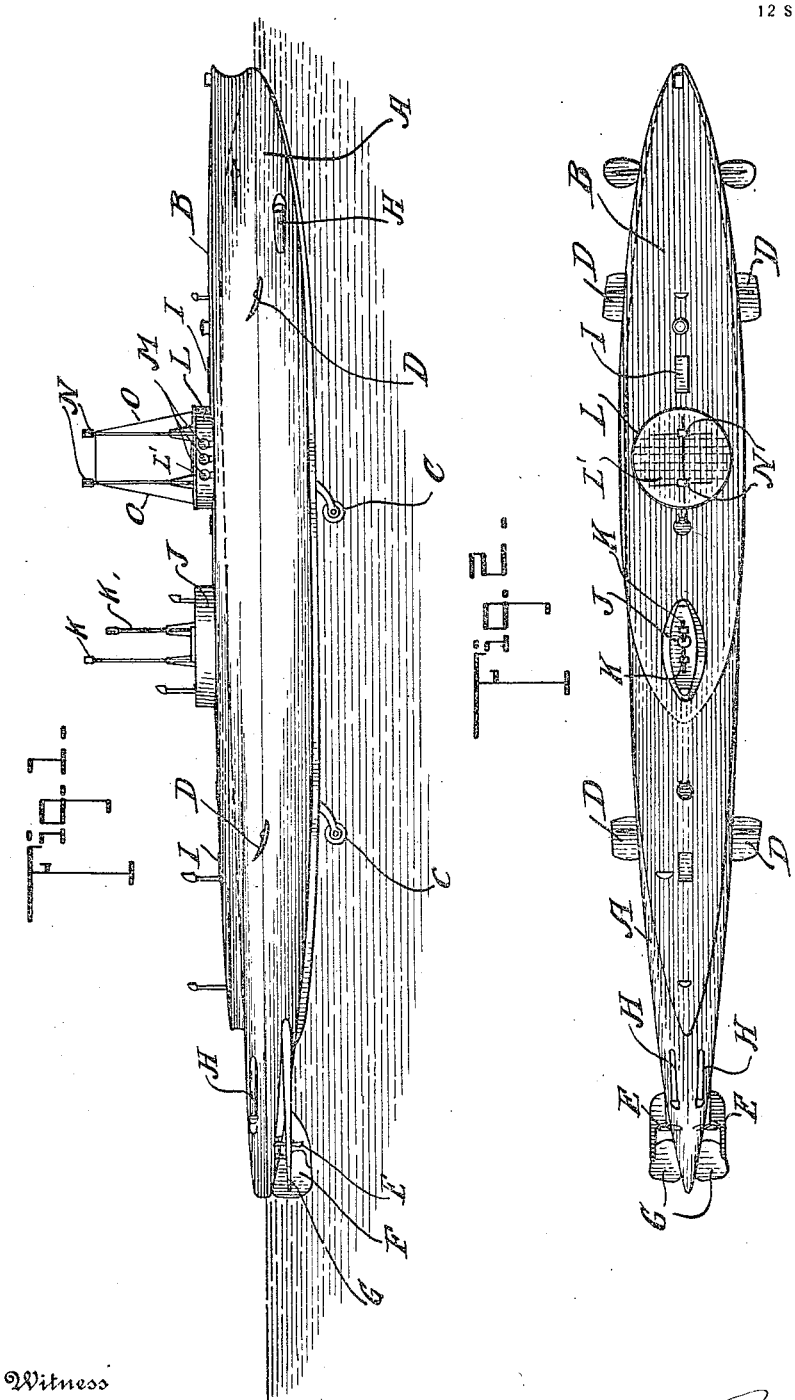

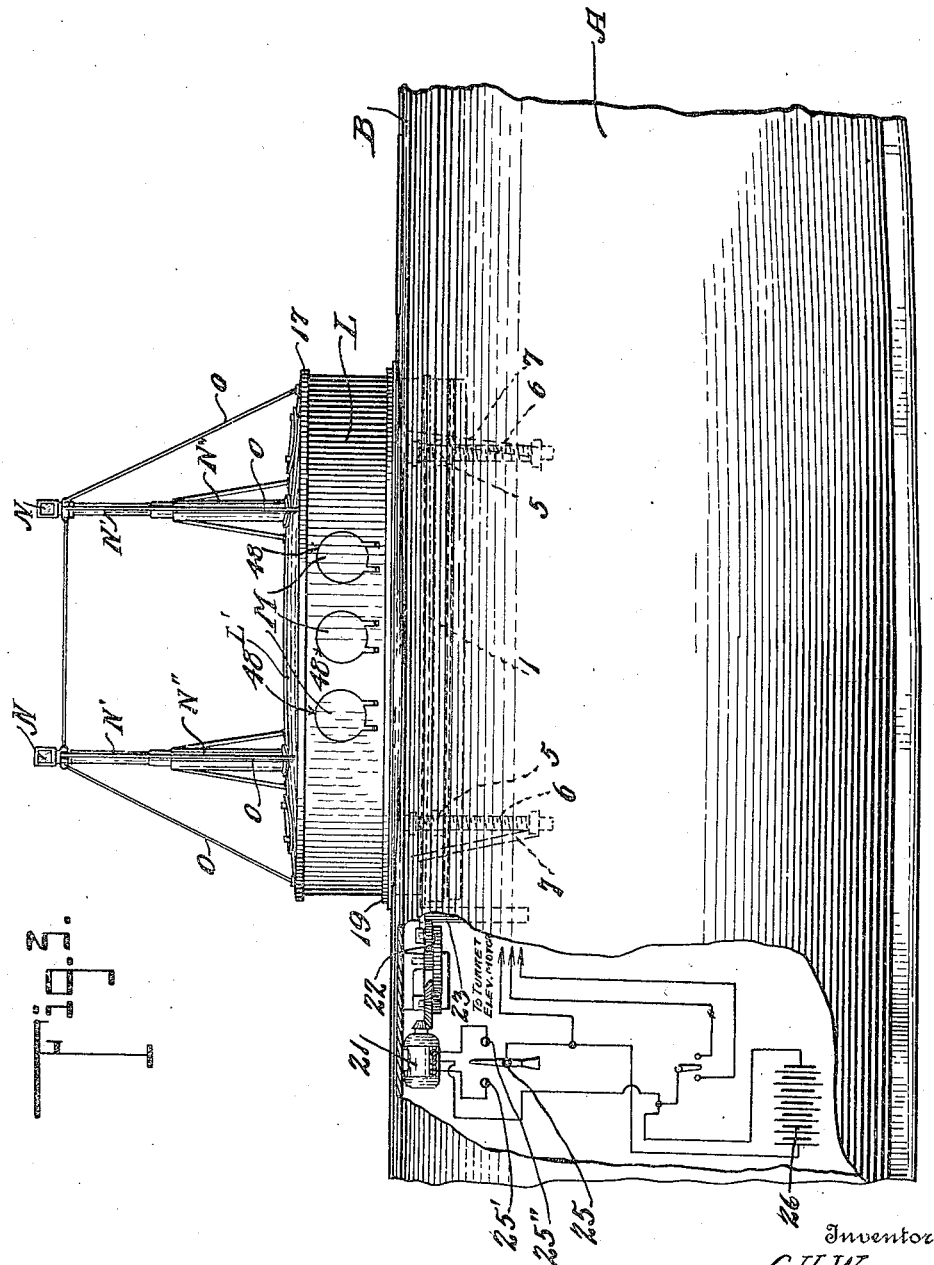

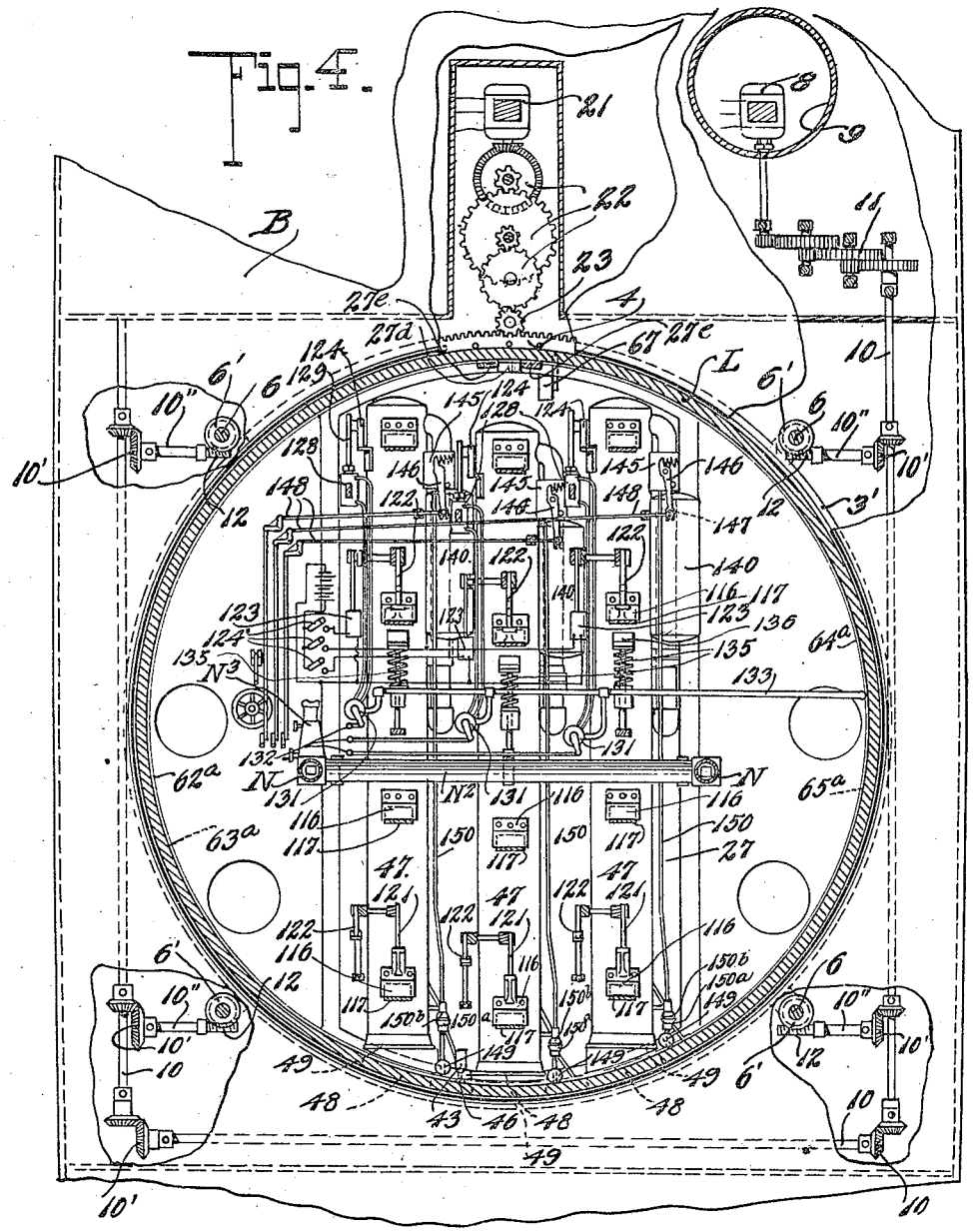

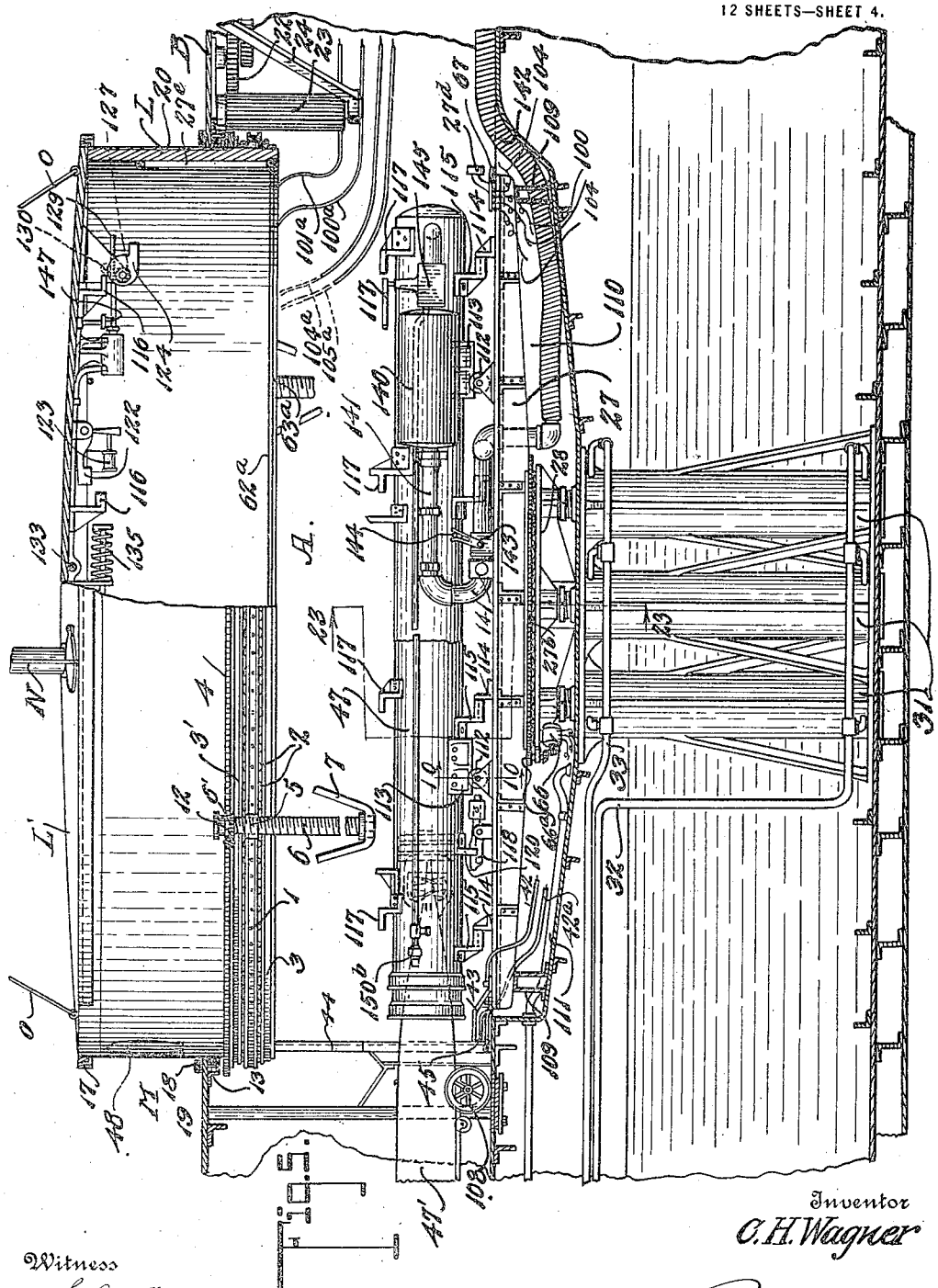

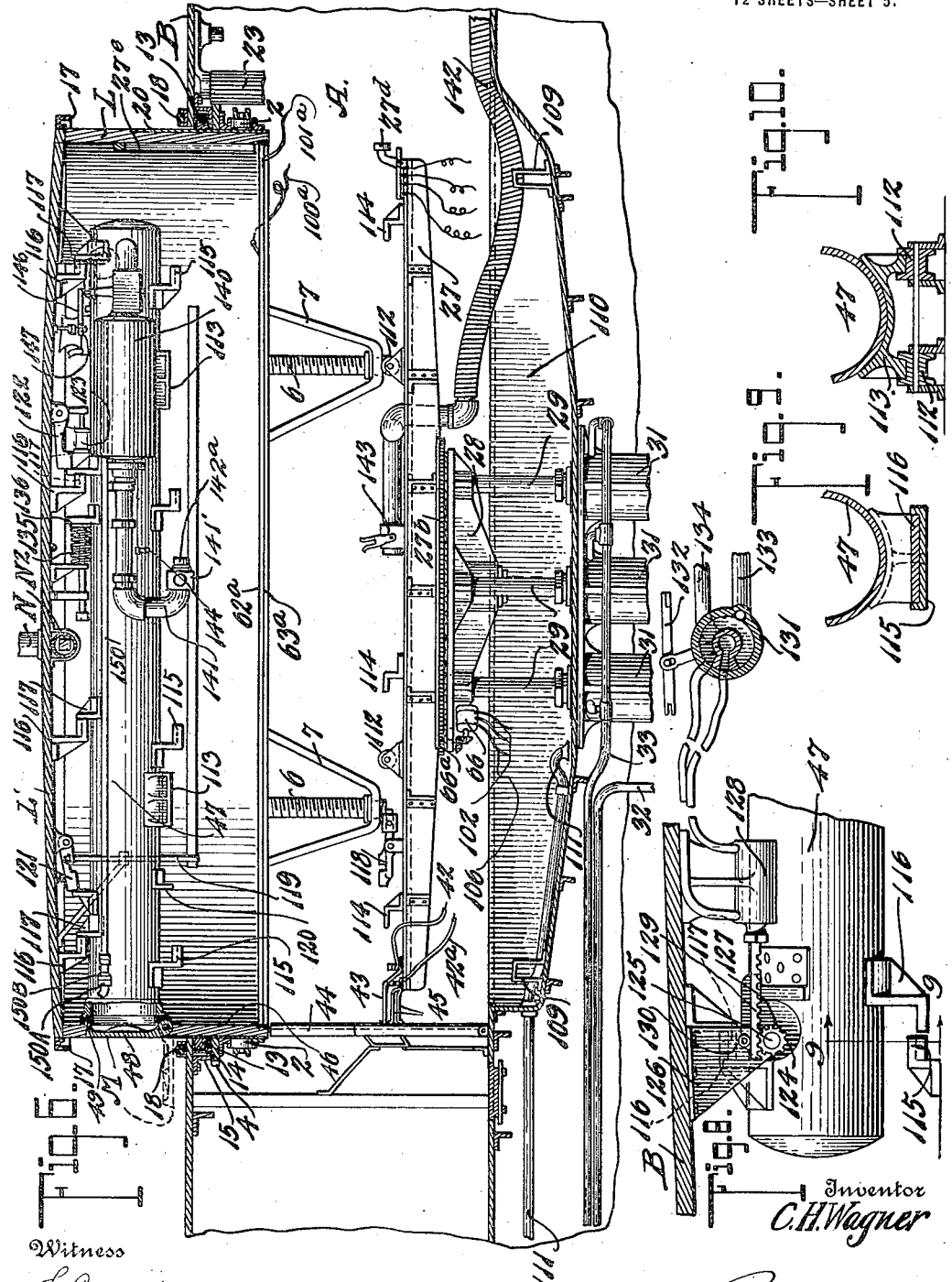

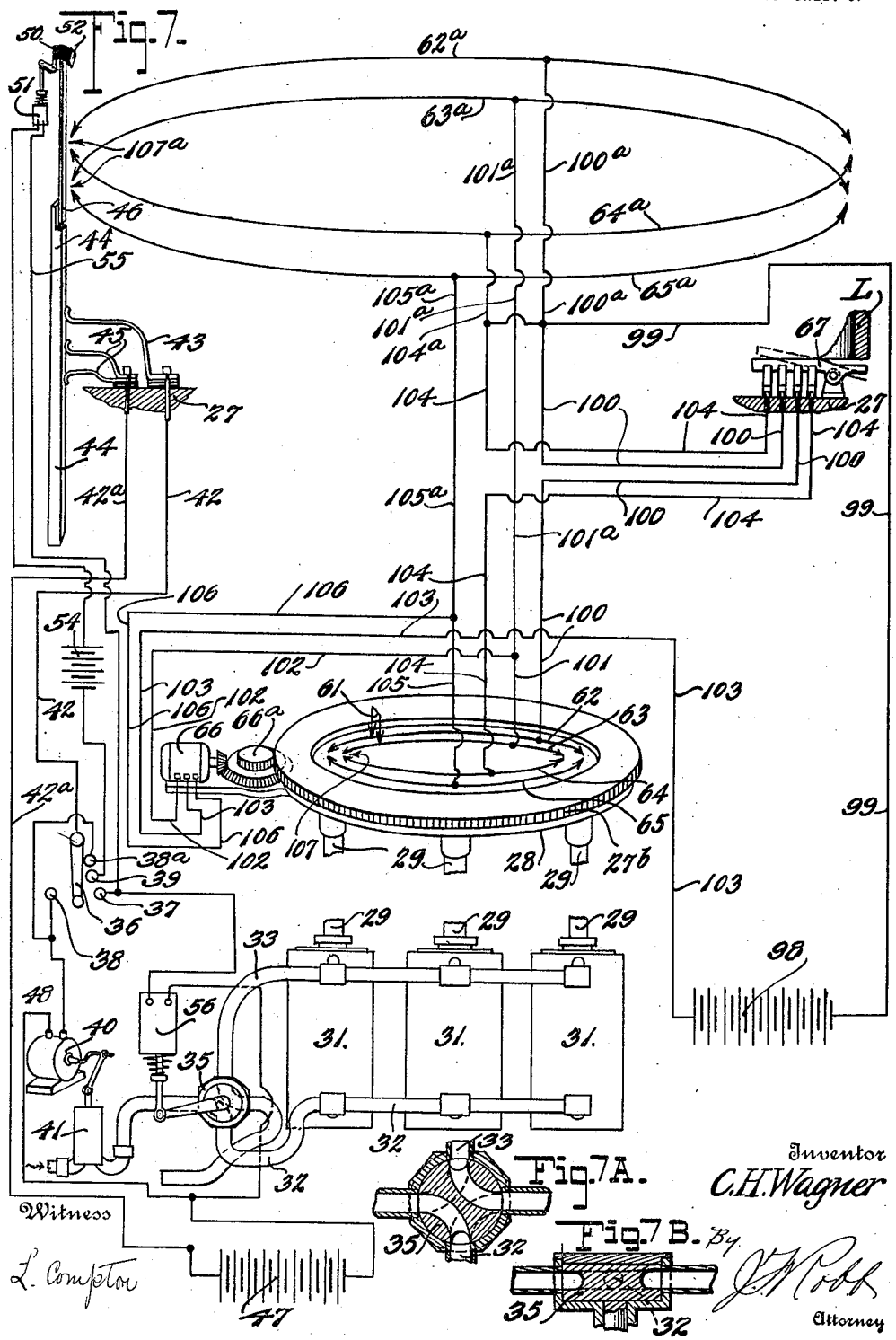

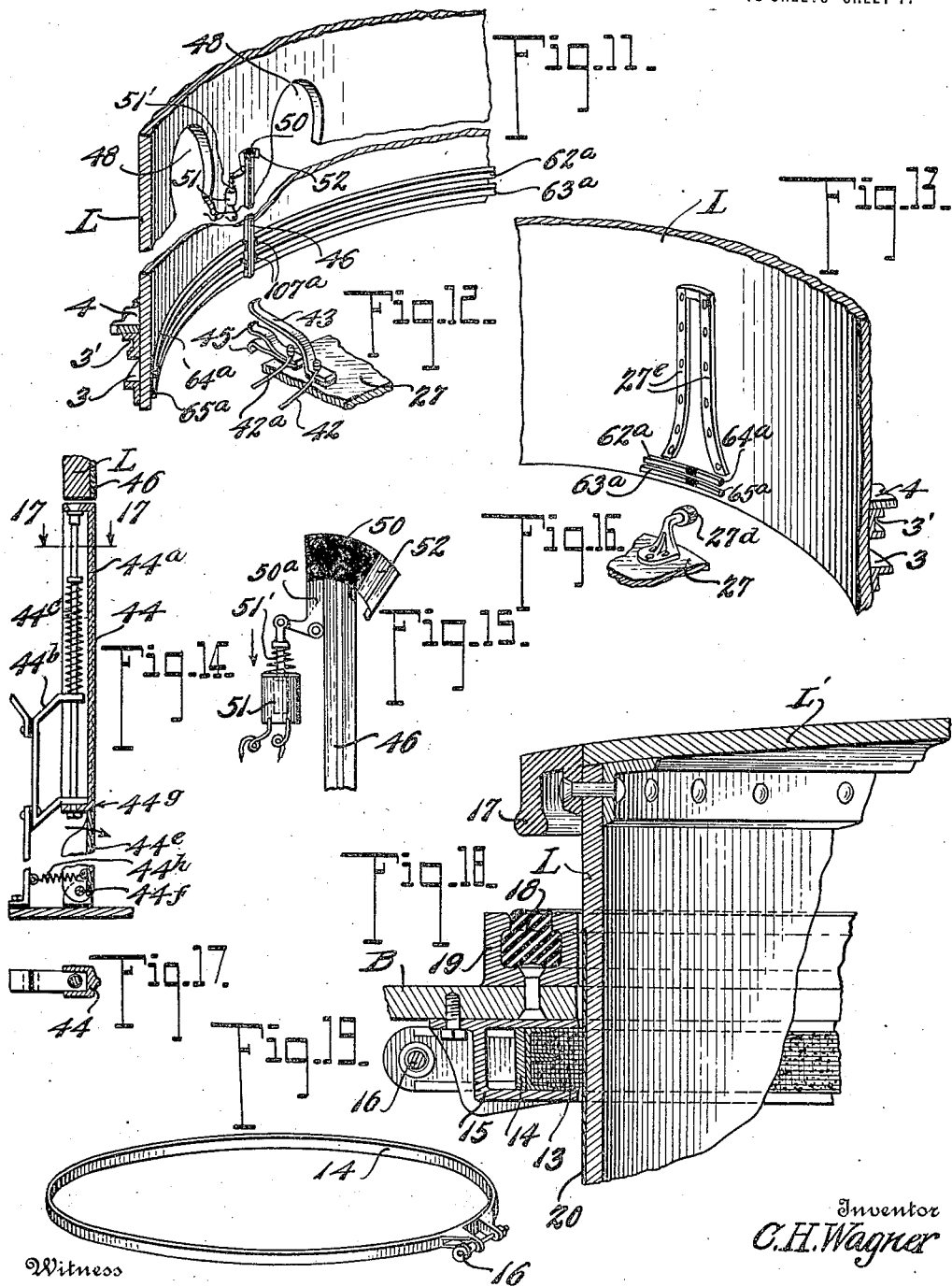

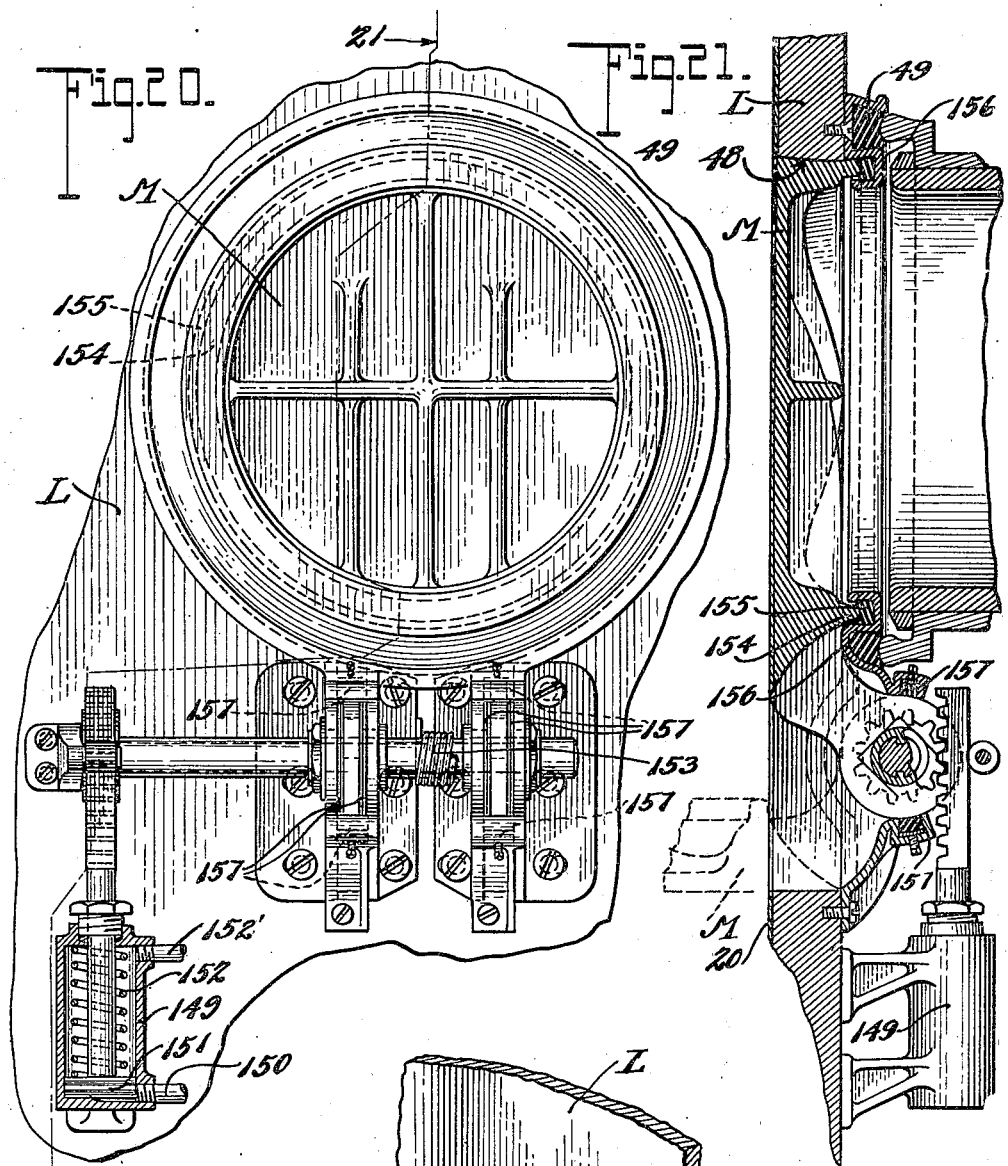

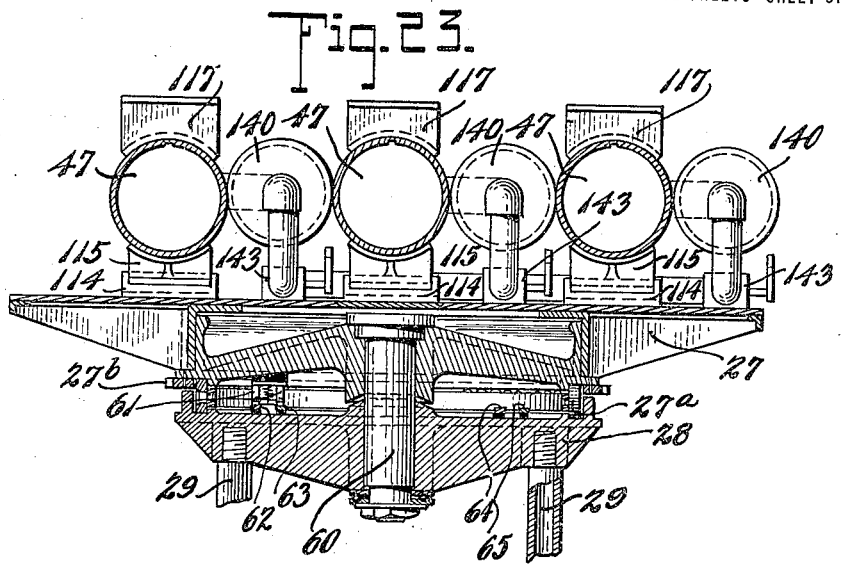
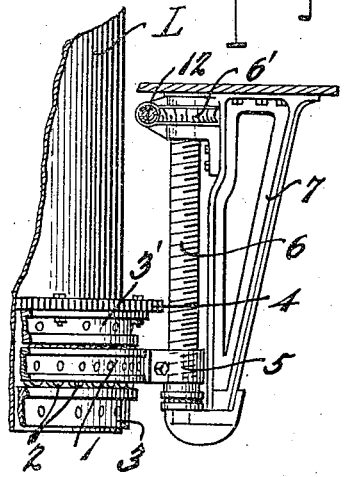

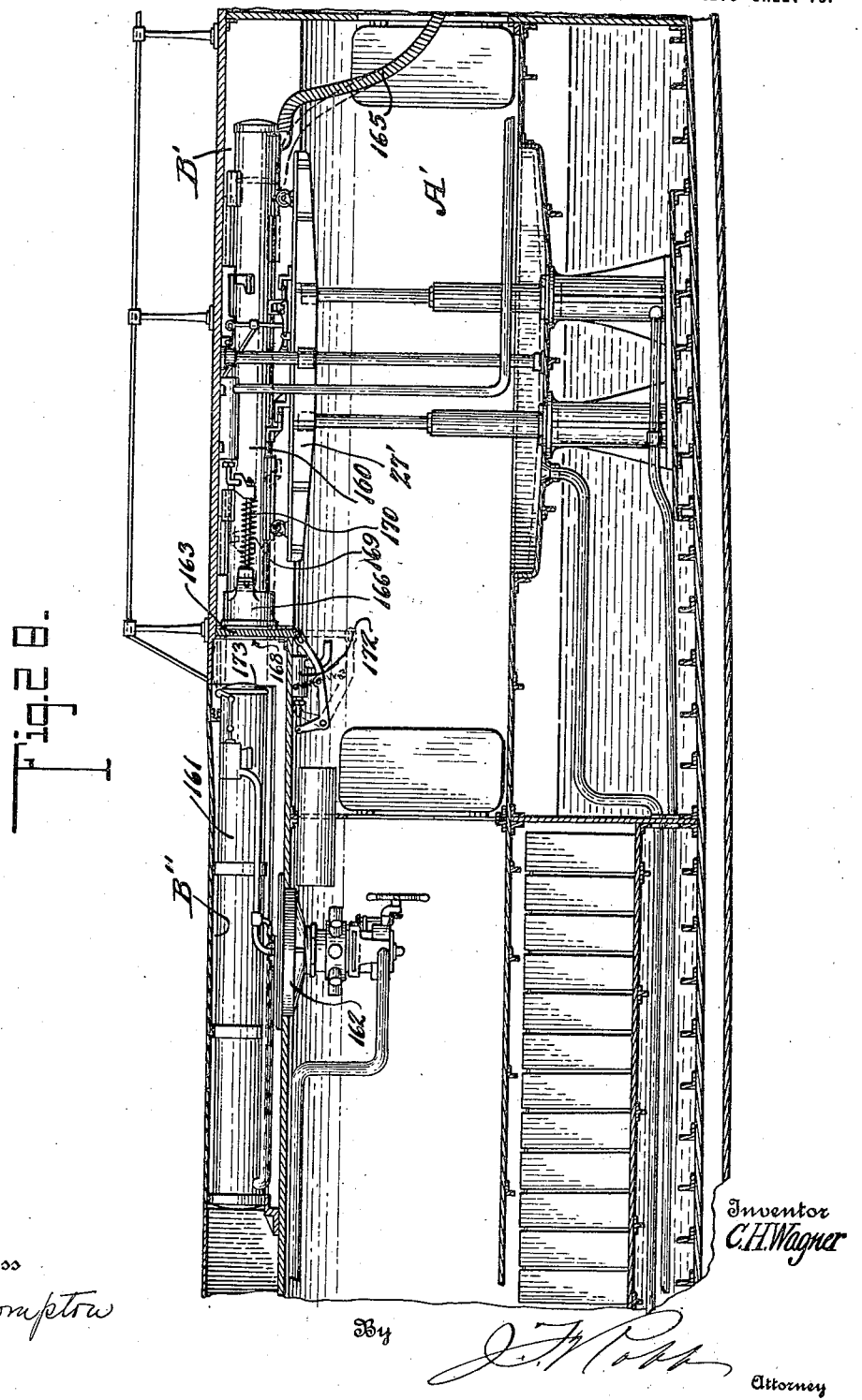

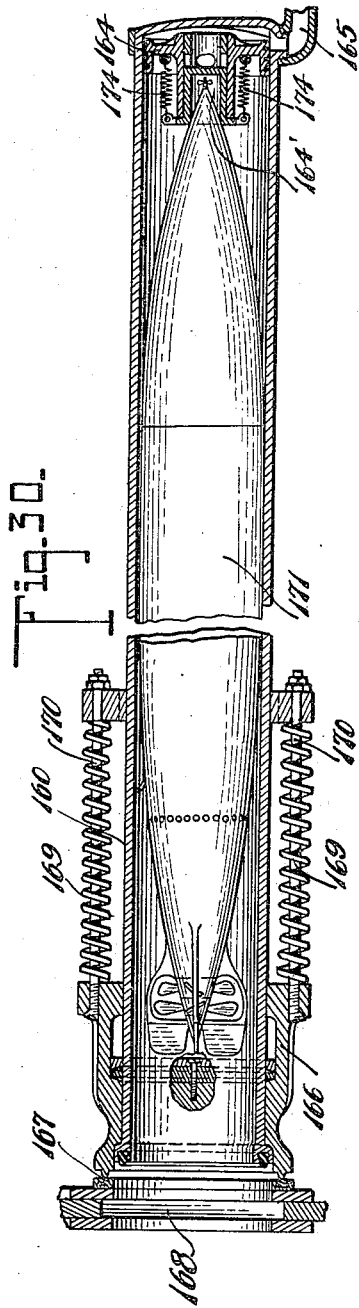
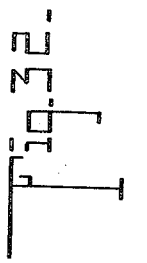
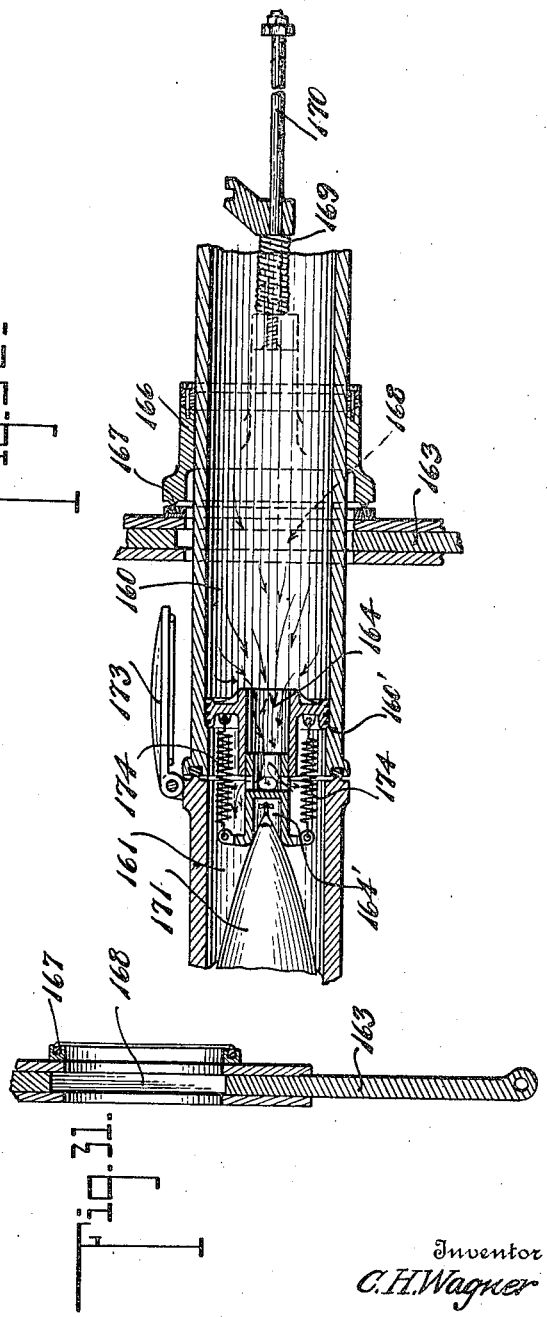

CHARLES H. WAGNER, OF WASHINGTON, DISTRICT OF COLUMBIA.

SUBMARINE BOAT.

1,363,937. Specification of Letters Patent. Patented Dec. 28, 1920.

Application filed January 24, 1918. Serial No. 213,586.

*To all whom it may concern:*

Be it known that I, CHARLES H. WAGNER, a citizen of the United States, residing at Washington, in the District of Columbia, have invented certain new and useful Improvements in Submarine Boats, of which the following is a specification.

The present invention appertains to the construction of submarine boats and involves primarily those features of such construction by which the aiming of the projectiles, and the loading and discharging of the latter relative to the torpedo tubes are facilitated.

It is well known that among the problems that have arisen today in regard to the offensive operation of submersible boats are those having to do with increasing the efficiency of such boats by obtaining greater flexibility of action in respect to the direction of firing of the torpedoes and greater speed with which the projectiles may be loaded into and discharged from their torpedo tubes.

With the foregoing in view, one of the most essential objects attained by my invention hereinafter presented is the capability of my construction admitting of continuous and related operations of aiming, discharging and loading projectiles, without depending, as regards discharging, upon any modification of the direction in which the boat is traveling. I obtain this particular object by utilizing a special construction of directable unit with associated loading and discharging means therefor permitting an operator to maintain at least one projectile aimed at an object and ready to be discharged toward the same, while another or other projectiles are being loaded into the directable unit for prompt use. The means employed for the purpose just stated I believe to be broadly new in my invention.

In the carrying out of my invention I utilize a turret structure from which the projectiles are discharged, or fired, which turret structure is of a disappearing type so that it may be raised or lowered, in the first instance, for firing purposes and in the second instance to reduce resistance to the progress of the submersible when submerged, to avoid leakage when the submersible is traveling at excessive depths, and for other advantageous purposes that will be apparent hereinafter.

Another important feature of the invention resides in the provision combined with a directable turret, of loading means for supplying projectiles to the turret to be fired therefrom, which loading means has certain important automatic phases of operation whereby projectiles loaded thereon to be carried thereby to the turret are caused to automatically assume certain predetermined proper positions in the turret preliminary to discharge of the same.

As a subsidiary feature of the mechanism just mentioned I utilize novel instrumentalities whereby projectiles to be fired, or to be discharged whether for firing or not, may be temporarily supported in discharging positions on the vessel, in suspension so to speak, and so left while the loading means carrying the same to such positions returns for a fresh load or supply of projectiles.

Additional features of my invention embody special novel operating means for the disappearing turret aforesaid, special novel means for operating a loading platform by which the projectiles are supplied to the turret, or to an equivalent structure in the event the turret as such is not used, special automatic means operated by the loading platform to render the firing mechanism for the projectiles operative, and special automatic electrical means insuring certain actions of the loading means previously mentioned, together with various other details of construction that will appear more fully in the following description and on reference to the accompanying drawings, in which:

Figure 1 is a view in side elevation of a submarine boat embodying the invention;

Fig. 2 is a top plan view thereof;

Fig. 3 is an enlarged fragmentary side view of the turret portion of the vessel, illustrating the electrical circuit diagrammatically, for rotating and elevating the turret;

Fig. 4 is a fragmentary horizontal sectional view depicting the projecting tubes and control mechanism, just beneath the top of the turret, also certain parts of the actuating means for the turret;

Fig. 5 is a vertical longitudinal sectional view showing many of the parts illustrated in Fig. 4 and also the loading platform or table with its operating mechanism;

Fig. 6 is a similar view illustrating the projectile tubes suspended in the turret and the loading platform lowered;

Fig. 7 is a diagrammatic view illustrating the electrical distribution system for automatic control and actuation of the parts so as to insure maximum efficiency in operation and also avoid liability of accident;

Figure 29:
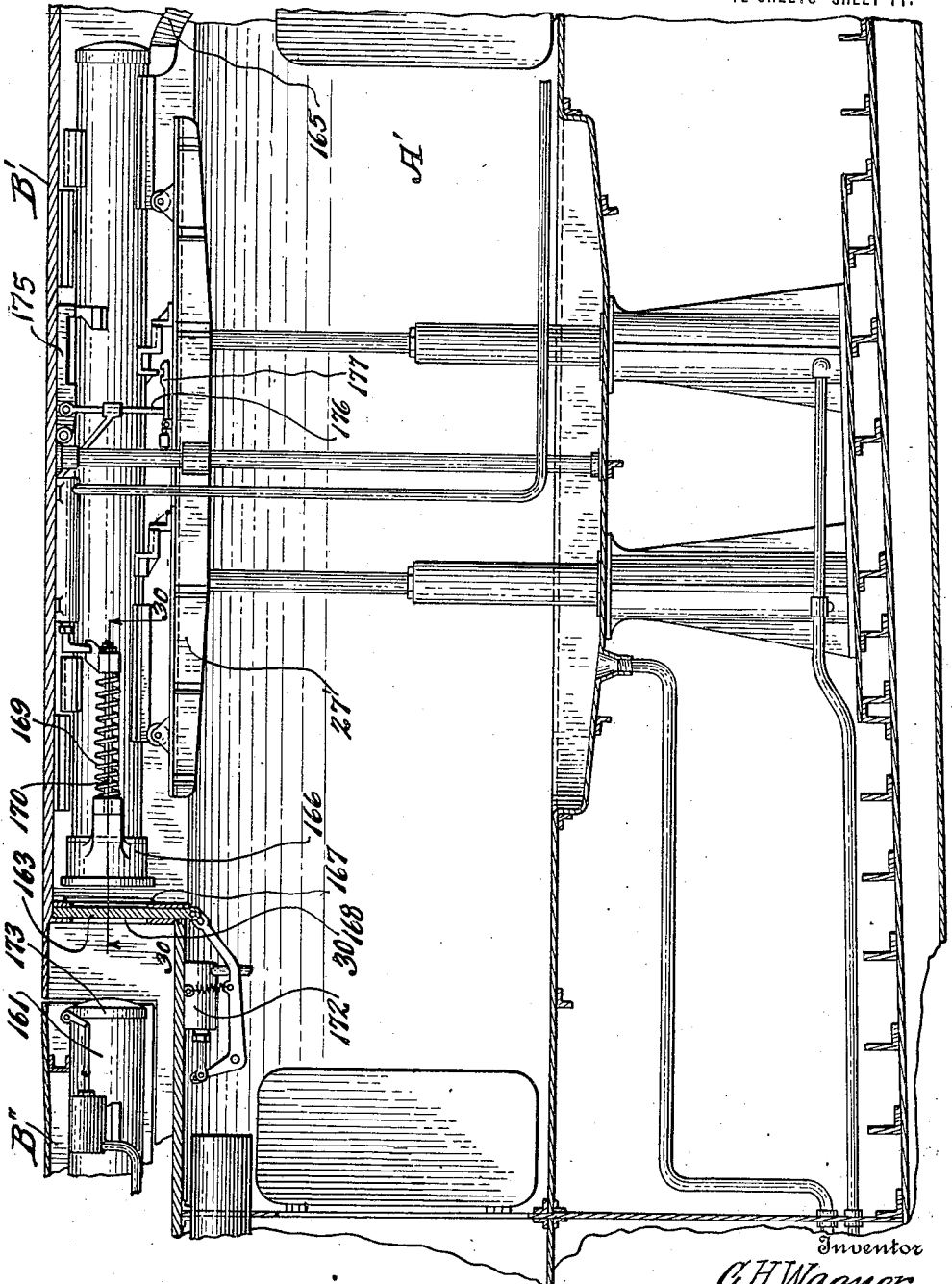

Figs. 7ᴬ and 7ᴮ are detail sectional views of the elevating piston control valves;

Fig. 8 is an enlarged fragmentary detail view showing one of the projectile receiving tubes and its advancing motor and valve control;

Fig. 9 is a section taken about on the line 9—9 of Fig. 8;

Fig. 10 is a section taken about on the line 10—10 of Fig. 5;

Fig. 11 is a fragmentary perspective view of a portion of the turret showing the arrangement of the contact rings;

Fig. 12 is a fragmentary perspective view of the loading platform showing the contacts thereon;

Fig. 13 is a fragmentary perspective view of a portion of the turret with its guide means for the loading platform;

Fig. 14 is a detail view in section of the lower contact bar;

Fig. 15 is a front elevation of the upper contact bar and circuit closer associated therewith;

Fig. 16 is a detail view of the guide means previously mentioned as coacting with the construction of Fig. 13;

Fig. 17 is a section taken about on the line 17—17 of Fig. 14;

Fig. 18 is a fragmentary vertical sectional view illustrating the turret packing gland and gasket arrangements;

Fig. 19 is a perspective view of the turret packing, retaining band detached;

Fig. 20 is a fragmentary view of a portion of the turret showing one of the projectile exit doors and its operating parts;

Fig. 21 is a vertical sectional view approximately on the line 21—21 of Fig. 20, parts broken away to show the method of packing the door hinges;

Fig. 22 is a fragmentary detail view of a portion of the turret and loading platform showing the switch for making and breaking the loading platform rotating motor circuit;

Fig. 23 is a vertical sectional view on the line 23—23 of Fig. 5, showing more fully the loading platform mounting and contact maker;

Fig. 24 is a fragmentary detail view of one of the turret elevating screws;

Fig. 25 is a fragmentary sectional view showing the mounting of the traveling nut for raising the turret;

Fig. 26 is a fragmentary view of one of the hydraulic cylinders, showing the pistons thereof;

Fig. 27 is a perspective view of the contact maker governing the rotation of the elevating table while the same is below the contact rings in the turret;

Fig. 28 is a longitudinal vertical sectional view of a portion of a submarine boat showing a modified form of loading device, the projectile handling means being moved partly forward and engaged with the deck, and the loading platform in elevated position;

Fig. 29 is an enlarged view of certain parts shown in Fig. 28, the projectile handling means being released for lowering and reloading;

Fig. 30 is an enlarged view taken at right angles to Fig. 29, the projectile handling device being moved forward and the end gate opened for loading the projectile into its firing tube, the latter not shown;

Fig. 31 is a similar view but fragmentary, showing the projectile exit gate;

Fig. 32 is a fragmentary view showing the projectile after it has been moved entirely from the loading tube into the firing tube, these two tubes being separate in the modification.

Referring particularly to Figs. 1 and 2, the hull of the submarine boat is designated A and has the usual deck B forming a superstructure which may or may not be watertight. C designates the usual wheels to travel on a river or ocean bottom, and D designates diving rudders of usual construction. The propellers are denoted at E, the main rudder at F and the diving rudder at G. There may be used the customary torpedo tubes shown at H and the torpedo receiving hatches I. The boat will also be equipped with the conning tower J and the customary periscopes K—K.

The present improvements contemplate the provision of the turret L having the torpedo tube and projectile discharge doors M; also there may be provided range finding periscopes N held in position against vibration by guy wires O.

*Turret elevating and lowering mechanism.*

Referring to Fig. 5, it will be noted that the turret L carries at its lower extremity a collar or band 1 having mounted thereon rollers 2. This band is journaled between two collars 3 and 3′, see Fig. 24, said collars being fixed to the turret L. At regularly spaced intervals around the band 1 are fastened supporting nuts 5, see Fig. 24, through which pass the turret raising screws or jacks 6, the screws 6 being supported from the vessel's main structure by suitable brackets 7. When it is desired to raise or lower the turret L, electric current is supplied to the motor 8 which is mounted in the watertight compartment 9, see Fig. 4, and the motor is adapted to drive shafts 10 through a train of gears 11. Bevel gearing 10′ connects the shafts 10 to shafts 10″ and the shafts 10″ carry worms 12 meshing with worm wheels 6′ fixed on the actuating screws 6. Reversal of the direction of the motor 8 of course controls whether the turret is raised or lowered.

Leakage of water between the deck B and the turret L is provided against by packing 13, see Fig. 18, which is held in contact with the turret by an adjustable band 14, see Fig. 19, adjustment of the band being obtainable by a bolt and nut connection 16, the parts 13 and 14 being mounted in the grooved annular supporting bracket 15.

When it is required to remove the packing 13, or when the vessel is running at extreme depths conducive to creation of leakage pressures between the parts B and L, the turret L may be lowered so that its flange 17 of the top L′ may rest on a special rubber packing or gasket 18 disposed in a U-shaped channel 19 fastened tightly to the deck B around the turret L. To prevent rusting between the packing 13 and the turret L a thin non-rusting metal veneer 20 may surround the turret at the portion impinged by the packing.

Turret revolving means.

The turret L is adapted to be rotated by a reversible motor 21 seen in Figs. 3 and 4. The motor 21 is geared to the turret by gearing 22 coacting with a pinion 23 which directly engages a circular rack fixed to the external wall of the turret. The gear element 23 is preferably considerably elongated vertically so as to remain in mesh with the coacting gear of the train 22 irrespective of the position or movement of the turret. The gear element 23 is supported at its lower end by a bracket 24, see Fig. 5. To revolve the turret L a switch 25, see Fig. 3, may be moved to engage the contact 25′, whereupon the motor 21 will be operated in one direction from the battery 26, thereby turning the turret in a predetermined direction. To reversely rotate the turret L the switch 25 is engaged with the contact 25″ and the current passes through the motor 21 in an opposite direction, thereby reversing the movement of the turret as previously referred to. The circuit connections are illustrated in Fig. 3 and are generally conventional as shown.

The projectile loading and discharging mechanism.

The means for loading and elevating and discharging the projectiles is shown in Figs. 4 to 10 and includes a loading platform 27 rotatably supported upon a vertically movable frame 28 which in turn is directly carried by a plurality of vertical piston rods 29. The rods 29 are connected directly with pistons 30, see Fig. 26, and the pistons 30 are adapted to be raised by pistons 30′, each of the latter being of hollow form to receive a piston 30. The reason for using the nesting piston constructions 30 and 30′ is due to the necessity of economizing space for the operating mechanism of the loading platform 27. The pistons 30 and 30′ are disposed in the cylinders 31 and 31′, considering the cylindrical extension of the piston 30′ as a cylinder. It will be evident that when a fluid pressure medium is admitted through the pipe 32 into the cylinder 31 the piston 30′ will move upward carrying the piston 30 with it and when it reaches the upper limit of its stroke the pressure medium will act through a port 30″ to thereafter raise the piston 30 to the limit of its upward stroke. During the upward stroke of said pistons any of the pressure medium above the pistons will exhaust through the passage 34 and pipe 33. The above action provides for elevation of the loading platform 27 and lowering of said platform is afforded by causing the pressure medium to enter the cylinder devices through the pipe 33, an opposite action of the medium on the pistons being thus effected. During downward movement of the pistons and lowering of the platform 27 the pressure medium below the pistons will be exhausted through the port 30″ and pipe 32.

The pressure medium is controlled in its action upon the pistons 30 and 30′ by a valve 35 shown in Figs. 7, 7ᴬ and 7ᴮ. As seen in Fig. 7, a switch 36 is provided having contacts 37, 38, 38ᵃ and 39 associated therewith, and the operation of which will be presented hereinafter.

A motor 40, see Fig. 7, is also utilized and operates a pump 41 by which the pressure medium is supplied to the cylinders 31 and 31′. When the switch 36 is turned to connect with the contact 38 current will flow through the wire 42, contact spring 43, the contact bar 44 (which is mounted upon the main structure of the boat) to contact springs 45, thence through the connected wire 42ᵃ and battery 47, thence through the wire 48 and the motor 40, and thence through the wire 49 to the contact 38. It is to be noted that the contacts 43 and 45 which are mounted on the loading platform 27 are insulated therefrom, while these contacts are in contact with the fixed bar 44, seen best in Figs. 6 and 7. Thus it is that the circuit including said parts can be closed and the platform 27 raised or lowered by operation of the pump 40 connected with the cylinders 31 aforesaid. If the platform 27 is rotated, however, the contacts 43 and 45 will not contact with the bar 44 and therefore the electric circuit just described can not be closed and elevation or lowering of the platform 27 can not be effected under such conditions. The turret L is provided on its interior with a contact bar 46, shown in Fig. 14, said bar being adapted to constitute a continuation of the contact bar 44 when the turret L and the platform 27 are in certain relative positions. In fact provisions are made according to this invention for the peculiar automatic operation of the parts L and 27 whereby to establish between the platform 27 and the turret L predetermined relative positions whereby to insure that the projectiles being raised by the platform may be properly positioned in regard to certain exit openings in the turret and likewise properly positioned in regard to certain suspension means by which these projectiles may be left supported by the turret when the platform 27 goes back to its lower normal position, say to bring up a fresh projectile in a tube from which one has been discharged.

The provisions just referred to are important because it will be evident from what has been set forth that the turret L is adapted to receive loaded torpedo tubes which are directable by a rotation of the turret. The equipment is such that a plurality of loaded tubes may be carried by the turret and when one is fired, notwithstanding that the turret is being operated for aiming a second projectile toward an object, the loading platform 27 may resume its downward travel with a discharged tube and bring back this tube reloaded while a firing operation is being planned for or performed through the control of the turret, and this relative action of the turret and platform 27 may be kept up continuously so as to afford an increased effectiveness of the submarine boat as an efficiency weapon as compared with anything thus far known.

With the foregoing in mind, therefore, I have made provisions for automatically stopping the platform 27 in its raising movement to supply fresh torpedo tubes to the turret L when the turret L has been turned from a normal position wherein the contact bars 44 and 46 are out of alinement. The said provisions cause the platform 27 to rotate until the contacts 43 and 45 are alined with the contact strip 46, whereupon stoppage of rotation of the platform 27 takes place and automatic additional raising movement follows until the freshly loaded torpedo is brought to its delivery position relatively to the turret L. The final raising movement of the platform 27 under the conditions just described is discontinued obviously when the contacts 45 and 43 reach a circuit breaker 50 (of insulation) at the upper end of the contact bar 46, the motor 40 of course ceasing to operate on breaking of the circuit at such time.

As seen in Fig. 15 the circuit breaker 50 is carried by a lever $50^a$ operable by the solenoid 51 and when operated pivotally the lever $50^a$ is adapted to bring a circuit making member 52 over the contact bar 46, for coöperation with the contact 43. By the use of the circuit closer or maker 52 a reverse or lowering action of the platform 27 is obtainable as well as its automatic action in finding, so to speak, its proper longitudinal position relatively to the boat, which position it may be observed is its normal position. Before describing the rather complicated automatic operations incident to the combined upward and rotative movements of the loading platform 27, the return or lowering movement will be set forth in connection with the diagrammatic illustration of Fig. 7.

To cause lowering of the platform 27 the switch 36 is shifted to connect with the contacts 37, $38^a$ and 39. The result is that current is caused to travel from the contact 39 through the battery 54, wire 55 and solenoid 51. The solenoid is thus energized, pulling downward on the lever $50^a$ and shifting the circuit closer 52 into alinement with the contact bar 46. The contact of the parts 52 and 45 and 46 and 43 causes the circuit to be completed through the magnet 56 which is connected to the valve 35 previously described and shown in Figs. $7^A$ and $7^B$. In this way the valve 35 is moved to reverse the action of the pressure medium from the pump 41, forcing the pistons in the cylinders 31 downward and relieving the pressure on their lower sides. Descent of the platform 27 results and if this descent is to be checked temporarily to obtain rotation to bring the platform to normal the last mentioned action will be effected automatically as will be later set forth herein. Of course the closing of the circuit as last mentioned involves not only the operation of the pump 41 but the motor 40 which is in the circuit and controls the pump.

As shown in Fig. 14 the contact bar 44 is preferably constructed with an upper portion $44^a$ slidable vertically upon a bracket $44^b$, rigid with the vessel hull. A spring $44^c$ is provided to normally hold the contact bar 44 in close proximity to the lower edge of the turret L. The lower portion $44^e$ of the bar 44 is pivoted at $44^f$ while its opposite portion has a bevel or cam edge $44^g$ coöperating with the upper section $44^a$. A spring $44^h$ tends to return the bar 44 to its normal vertical position. When the turret L is lowered the lower edge will abut with the upper end of the contact bar 44 forcing the latter downward. The lower portion of the bar $44^a$ will cause the lower section $44^e$ to be cammed out, thus allowing the upper section $44^a$ to move downward. When the turret L is elevated the spring $44^c$ of course raises the upper portion $44^a$ to its normal position, thus allowing the lower pivoted section $44^e$ to move into its normal or operative position by virtue of the spring 44ʰ.

*Automatic turning operations of loading platform.*

It will be evident on reference to Fig. 7 particularly that if the circuit including the motor 40 and pump 41 is maintained closed by the contacts 43 and 45, a vertical movement of the platfrom 27 is compelled. Therefore if the turret L is in a position in which its contact bar 46 is in vertical alinement with the contact bar 44 the closing of the circuit operating the motor 40, as previously generally described, enables the platform to move from its normal position in the hull A upward into the turret L so as to deliver projectiles, in this instance the torpedoes of a common type disposed in the torpedo tubes 47, to the turret. Furthermore, such delivery will be effected with the torpedo tubes disposed in alinement with the discharging or exit doors 48 provided in the turret. Fig. 5 illustrates how the torpedoes 47' may be loaded into the open ends of the tubes 47, by any customary mechanism provided for this purpose, while the tubes are in their lowermost positions with the platform 27 correspondingly adjusted. Fig. 6 illustrates the manner in which the tubes loaded with the projectiles have been elevated and left supported by the top of the turret L, the platform being returned to its lowermost position.

The condition which must be met in actual operation of the submarine, however, is one wherein the turret L is turned to keep the projectiles aimed in the direction of discharge for effective use. This is true whether the turret L is in its lower position or its upper position. Therefore, ordinarily the contact bar 46 of the turret L is not in alinement with the contact bar 44 and I therefore provide means whereby in such event, as the platform 27 moves upward, say when the switch 36 is moved to the contact 38, the upward movement is arrested as soon as the contact 43 passes off of the contact bar 44. Therefore through the provision of other contact members on the turret the platform 27 will be automatically rotated until the contacts 43 and 45 reach the contact bar 46 whereupon the upward or vertical movement of the platform will be resumed automatically and maintained until the loaded torpedo tubes 47 reach positions in which they may be delivered to the supports on the turret, at which time the vertical movement of the platform 27 ceases. The tubes 47 are thus always delivered to the turret practically in proper alinement with what may be termed the line of fire, positions for immediate discharge, and since the provisions to effect these are automatic, there is no liability of course of a disarrangement of the mechanism through failure of control depending upon any human factor.

It may be noted that reverse or lowering movements of the platform are likewise compellable as will later be pointed out, involving a downward vertical movement of the platform in the turret, rotary movement of the platform until it reaches its normal alinement to enter the hull, and then a subsequent downward movement to actually resume its normal position.

The platform 27 is supported by antifriction rollers 27ª and a pivot or king pin 60, see Fig. 23. It carries fixed thereto contact brushes 61 held in contact with semicircular contact strips 62—63 and 64—65, see Figs. 23 and 7. A platform rotating motor 66 is adapted to turn the platform through reduction gearing 66ª engaging a circular rack 27ᵇ on the platform. The turn table 27 carries a circuit breaker 67 arranged to break the circuit including the contact strips 62 and 63, and 64—65, the breakage occurring when the turn table enters the turret, at which time, as seen in Fig. 7, the circuit breaking lever 67 impinges the lower edge of the turret and is rocked upwardly to cause breaking of the circuit. Simultaneously with such circuit breaking action the contacts 43 and 45 engage semi-circular contact strips 62ª and 63ª, or 64ª and 65ª, dependent upon the direction in which the turret has been previously turned, said strips being mounted in the turret and insulated therefrom, (see Fig. 11).

Referring to Fig. 7, it is to be understood that the strips 62ª and 63ª and 64ª and 65ª come into play for coöperation with the contacts 43 and 45 only when the platform 27 is moving upward. Should the contact brushes 61 be in contact with the strips 62 and 63, current from the battery 98 will pass through the circuit wires 99—100, through the circuit breaker 67, thence through the contact strip 62 across the contact maker through the brushes 61, strips 63 and wire 101, wire 102 to one of the binding posts of the motor 66. The motor 66 will thus be turned in one direction and the current passes out through the return wire 103 back to the battery 98. As long as the brushes 61 engage the strips 62 and 63 the motor 66 will continue to operate and rotate the turn table 27. When, however, the brushes 61 reach an insulating space 107 between the ends of the contact strips 62—63 and 64—65, the said circuit will be broken and the rotation of the platform 27 will stop. When the contacts 43 and 45, however, have engaged one or the other of the sets of strips 62ª, 63ª, or 64ª, 65ª, and the circuit breaker 67 has broken the rotating circuit just above described. Renewed rotation of the platform 27 is set up by the coöperation of the contacts 43 and 45 with the set of upper strips mentioned and the turn table 27 is turned until the contacts 43 and 45 engage the contact bar 46, whereupon the platform again moves vertically with the projectiles thereon alined with the discharge openings 48.

If the contact brush 61 coöperates with the other set of strips 64 and 65 the electric circuit established will be this: Current passes from the battery 98 through wire 99, wire 104, the circuit breaker 67, to the strip 64, across the brush 61, through the wire 105, through the wire 106, to the other binding post of the motor 66 to effect a reverse action of the motor from that previously just described. From the motor the current passes out through the return wire 103 back to the battery 98. These circuit connections may be conventional but are at all times operative unless the turntable 27 is in or entering the turret L, at which time the circuit breaker 67 by contacting with the turret walls causes both of the previously mentioned circuits to be broken and rendered inoperative. Simultaneously with this action of breaking the circuits the contact members or springs 43 and 45 of the platform contact with the semi-circular strips 62ª—63ª, or 64ª—65ª, which are insulated from the turret wall but fastened thereto. These strips are similar to the lower strips 62—63, and 64—65, respectively and have the insulated space 107ª corresponding somewhat to the insulated space 107 before referred to.

Now it will be readily seen that should the contact springs 45 and 43 make contact with the strips 62ª and 63ª, current from the battery 98 will flow through the circuit wires 99 and 100ª, thence across the contact member 45, thence through the wires 101ª, 102 and to the binding post of the motor 66 through the motor and out over the return wire 103 back to the battery 98. If the other circuit, namely that including the strips 64ª and 65ª be closed by the contact springs 43 and 45, current will then flow from the battery 98, through wires 99 and 104ª to the contact strip 64ª and spring contact 45 to the contact strip 64ª, through the wires 105ª and 106 to the other binding post of the motor, operating the latter in a reverse direction to that just mentioned above. From the motor current passes through the return wire 103 back to the source of energy 98.

A complete cycle of operation of the parts may thus be set forth: With the turn table 27 in the position of Fig. 5, and the tubes 47 loaded with projectiles, for which purpose carriage 108 may be employed, the switch 36 is engaged with contact 38, assuming that the position at which the turret L is adjusted is other than normal, with the contact bars 44 and 46 out of alinement. As the platform 27 moves upward into the turret the contacts 43 and 45 approach the contact strips 62ª—63ª, or 64ª—65ª, dependent upon the direction in which the turret L has been turned. On the contacts 43 and 45 making contact with a predetermined pair of said strips during the upward movement of the platform 27, the circuit breaker 67 engaged by the lower edge of the turret L breaks the circuits which are closed or made operative by the brush member 61 and the raising of the platform ceases. Simultaneously the springs 43 and 45 engage with one or the other of the said strips 62ª—63ª and 64ª—65ª, as the contacts ascend the bar 44, the last mentioned action of course breaking the circuit including the motor 40 and causing the elevation of the platform to cease. Thereafter the platform revolves until the contacts 43 and 45 pass off the set of circular strips with which they coöperate and onto the contact bar 46, again causing operation of the motor 40 and elevation of the platform. The platform is now alined with the direction of fire to be determined by the adjustment of the turret and the elevating movement ceases, of course, when the contact 45 reaches circuit breaker 50 in the manner previously set forth and the torpedo tubes 47 are ready to be moved forward into engagement with the water-tight cushions 49 surrounding the projectile exit doors 48.

There are provided between the tubes 47 and the top of the turret L certain interengaging means supporting and locking the tubes in their firing or discharge positions, which means will be set forth hereinafter, said means likewise being disengaged when it is desired to lower the tubes to be reloaded.

Assuming that one or more of the tubes 47 has been discharged, the reloading is accomplished by throwing the switch 36 into engagement with the contacts 37, 38ª and 39. By doing this the circuit maker 52, Fig. 15, is caused to be thrown over into alinement with the bar 46 by energizing of the solenoid 51. Likewise the circuit including the motor 66 is completed by the coöperation of the contacts 43 and 45 with the parts 46 and 52 and the motor operates reversely to lower the platform. Thereafter the contacts 43 and 45 coöperate with the strips 46 and when the platform reaches the lower end of the turret the raising and lowering circuit is broken. The circuit breaker 67 drops into place. This action reëstablishes the platform rotating circuit through the coöperation of the contacts 43, 45 with the elements 62—63 or 64—65, the circuit including such elements being closed by the contact member 61. The platform 27 now revolves until the brush 61 registers with the space 107 at which time the contacts 43—45 will engage the bar 44, again closing the platform raising and lowering circuit and causing the platform to move downward to its normal position within the hull ready to receive the fresh projectiles in its tube or tubes 47 thereon.

The platform rests upon the supports 109 in a well 110, the latter being adapted to receive water which may leak into the hull between the turret and deck, which water is withdrawable through the suction pipe 111.

*Projectile discharge tubes and coöperation with the loading platform and turret roof.*

The platform 27 has thereon the rollers 112 received in the supporting tracks 113 on the tubes and allowing free reciprocation of the tubes 47 on the platform. The tubes 47 have depending lugs 115 coöperative with lugs 114 of the platform to hold the tubes from displacement while carried by the platform. A latch 118 and engaging lug 120 are provided to automatically hold the tubes with the aforesaid lugs 114 and 115 engaged, said latch being disengageable only when the tubes are elevated. Similar lugs 116 and 117 are provided on the turret roof and the tubes 47 respectively to support the tubes 47 practically suspended from the turret when advanced to the projectile discharging positions. A latch 121 provided to prevent each tube from becoming accidentally disengaged from the lugs 116 is connected with a rod 119 so that it is impossible for the tubes 47 to be released except when the turn table is elevated to engage the rod 119 and ready to receive the load of the tubes whether empty or containing their projectiles. An additional safety latch 122 is provided and operable manually from a control switch 124 (see Fig. 4) adapted to close a circuit including the solenoid 123 connected with each safety latch.

*Torpedo tube actuating means.*

To move the tubes 47 into proper operative contact with the cushions 49 around the doors 48, a cam 124 is provided, said cam having a shaft 125 journaled in a bracket 126 supported on the roof of the turret. The shaft 125 carries a pinion 127, see Fig. 8, and an actuating device including a cylinder 128 and piston therein is provided, the piston rod having a rack 129 engaging the pinion 127. A roller 130 is carried by the bracket 126 to hold the piston rack 129 in mesh with the pinion 127. The cylinder actuating device 128, one of which is provided for each torpedo tube, is controlled by a suitable valve 131. It is adapted to be actuated by a control rod 132 shown in Fig. 4, the pressure medium entering the cylinder 128 being supplied through a conduit 134 common to the various cylinders 128, and exhausted from the cylinders through conduit 133.

Any suitable means may be used for retracting the tubes 47 from their engagement with the cushions 49, and the lugs 116. I have shown for this purpose a spring 135 which is placed under tension by contact with a lug 136 on the discharge tube 47, as said tube is moved forward.

Each tube 47 has a container 140 for the pressure medium by which the projectile therein is discharged, said pressure medium being supplied through the flexible conduit 142 connected preferably to an air compressor not shown. The discharge means 140 is such as conventionally employed for torpedo discharging operation in submarine boats. The container or tank 140 has a check valve 141' to prevent egress of the fluid supplied thereto by the conduit 142 when the latter is detached from the tank. When the tubes 47 are engaged with the platform 27 the discharging tanks 140 are in communication with the supply conduits 142 and are filled automatically. A valve 143 is arranged to cut off the supply of fluid through the conduits 142 and is operated by a projection 144 on each tube 47. Thus as seen in Fig. 6 when the platform 27 is elevated the pin 144 will engage the slot of the arm of the valve 143 so that upon retraction of the tube 47 the pin 144 will open the valve 143 simultaneously with the engagement of the conduit 142 with the conduit section 142ª which is carried by each tube in connection with its tank 140. When communication is thus established the pressure medium will flow from conduit 142 through the section 142ª past the check valve and into the tank 140. The communication remains established until the tube 47 is moved forward against the cushions 49 when the pin 144 will close the valve 143. There is the usual discharge valve 145 between the tank 140 and the tube 47, said valve carrying a slotted arm 146 adapted to coact with the projection 147 mounted on and operated from the "fire" control rods 148. When the tubes 47 are retracted to be reloaded the arms 146 of the valves 145 are also retracted, rendering it impossible to discharge the projectiles from the tubes unless the tubes are in their discharging positions.

The valve 145 has a by-pass of known construction so arranged that the initial movement of the valve by the arm 146 allows air to pass through the by-pass which communicates with the door operating cylinder 149 by means of a conduit 150, see Figs. 4, 20 and 21. The doors 48 will therefore remain open after the discharge valve 145 is open so long as there is pressure in the tank 140. Of course when the projectile has been discharged from the tube 47 the reduction of pressure in the tank 140 will relieve the pressure upon the discharge door operating piston 151, and the spring 152 will close the door. If found advisable the pressure medium may be introduced through the conduit 152′ controlled by a valve for accomplishing the aforesaid result.

As seen in Figs. 4, 5 and 6, the conduit 150 is provided with a socket and nipple 150$^a$ and 150$^b$ respectively, adapted to establish a communication with the port closure piston 150 only when the discharge tube is in its proper firing position.

Door construction.

It is necessary that the door 48 be water-tight while the tubes 47 are retracted or lowered for loading. Each door is therefore provided with an annular flange or ring 154 adapted to seat upon the annular cushion 155 held in a groove of the retaining member 156, said member being also adapted to support or hold the annular tube cushioning means 49 previously mentioned. Suitable packing may be used as shown at 157 to render the hinges or pivots of the doors water-tight, see Fig. 21.

Platform details.

The platform 27 has at its opposite ends guide rollers 27$^d$ adapted to enter the space between vertical guide 27$^e$ on the turret, the upper portions of these guides converging and said parts constituting means to accurately aline the projectile tubes with the openings of the discharge doors 48. These details are shown in Figs. 13 and 16.

Setting and range finding devices.

Fig. 3 illustrates spaced periscopic setting devices N′ with the periscopic heads N extending upward through the roof of the turret L. These devices are adapted to be adjusted to aline them with an object toward which the torpedoes are to be discharged. At their lower ends the devices N′ are connected by a tube N$^2$ and a range finder of known type N$^3$ (see Fig. 4) is disposed at one end of the tube N$^2$. The devices N′ are mounted in tubular standards N″ on top of the turret L. Since the turret L is revoluble it will be apparent that the periscopes N may be brought into alinement with an object as an incident to the adjustment of the turret whereby the movability of the latter performs a double function. While I do not show such means, I contemplate that certain relative movements of the turret and devices N′ may be effected so that allowance may be made in the setting apparatus for traveling movement of an object to be fired at, such allowance involving an additional movement of the turret L beyond that necessary to aim the projectiles therein at the object to be destroyed.

Figs. 28 to 32 inclusive illustrate the adaptation of certain principles of operation and construction of my invention to a known type of submarine boat. In this construction the hull A′ has the main discharging section B′ for the projectiles and the directable discharging section B″. The main projectile discharging section B′ is used primarily to support the projectiles or torpedoes in the loading tubes 160 from which the projectiles are adapted to be mechanically shifted into the firing tubes 161, the latter being mounted in the directable section B″. The section B″ is supported on a turn table 162 adapted to be operated in a known manner to facilitate the discharge of the projectiles from the tubes 161 toward the object to be fired at. I contemplate the use of elevating platform 27 previously described for facilitating placing within the boat its maximum quantity of projectiles, and for loading these projectiles back into the firing tubes 161. In other words, when the projectiles are being loaded on the boat from the mother ship or supply port, they will be disposed on the directable section B″, the door 163 opened and the projectiles shifted into the loading tubes 160 supported on the platform 27, and the platform thereafter lowered and the projectiles or torpedoes removed therefrom and stored away in the boat. Under operating conditions for offensive purposes the tubes 160 are of course adapted to receive the projectiles from within the boat when the platform 27 is lowered. The latter is then adapted to be raised by suitable means such as before set forth and the torpedoes may then be shifted from the discharging section B′ to the directable section B″ by the means shown best in Figs. 30 and 32. Such means includes a piston 164 in the tube 160 with which tube is connected a flexible conduit 165 adapted to supply a pressure medium to act on the piston 164.

Suitable means are provided to shift the tube 160 so that its yielding head 166 is adapted to engage a gasket 167 surrounding the projectile exit opening 168. A water-tight connection is thus made between the wall at the opening 168 which opening is normally closed by the door 163. The head 166 is yieldably held on the tube 160 by the springs 169 and the guide rods 170 act to guide the head in its movement. When the tube 160 is thus engaged with the wall of the section B′ and with the gasket 167 the operator will supply pressure to act upon the piston 164 and said piston will be moved lengthwise of the tube 160, thereby forcing the projectile or torpedo 171 out of the tube 160 into the projecting tube 161. Previous to this, of course, the door 163 is opened by conventional means shown at 172 and the gate 173 at the inner end of the tube 161 likewise opened to permit entering of the torpedo. The relative movement of the parts 160 and 166 permits the outer end of the tube 160 to pass through the opening 168 into engagement with the inner end of the tube 161 as shown in Fig. 32.

The piston 164 has a special yielding section 164' connected with it by springs 174 and the pressure on the section 164' which is hollow will shift the torpedo completely into the tube 161 by extension of the springs 174, the movement of the piston proper 164 being limited by the shoulder 160'. On relieving the pressure against piston 164 the springs 174 return the piston section 164' to a position within the piston 164 and the tube 160 in a manner which will be obvious. Any suitable means, either air pressure or other means may be used to return the piston 164 to its normal position as shown in Fig. 30. Of course when the tube or tubes on the section B² have been loaded into the projecting tubes 161, said section B² may be turned at will for firing purposes.

As seen in Fig. 29, provision is made by a latch 175 to lock the loading tube 160 positively engaged with the gasket 167 to insure a water-tight seal between the tube 160 and the wall of the discharging section B in the operation of shifting the torpedo from the tube 160 to the tube 161. The latch 175 is operable by the depending rod 176 to release the tube 160 when the door 163 is closed and when it is desired to reverse the movement of the tube 160 to engage it with the platform 27, lower it and reload it. When the tube 160 is supported on the platform 27 it is locked against longitudinal displacement by the catch 177 releasable also by the action of the rod 176 in a manner which will be obvious.

Having thus described my invention, what I claim as new is:

1. In submarine boat construction, the combination with a hull, of a turret thereon accessible from within the hull, a projectile holder, projectile supply means to actuate the holder to cause it to enter the turret, and an automatically connectible coupling to supply pressure air for said holder incident to movement thereof within the turret.

2. In submarine boat construction, the combination with a hull, of a projectile discharging section thereon, a projectile loading platform operating in the hull and movable to carry a projectile to the said discharging section, means to discharge the projectile and means to interlock the projectile in a position supported either by the discharging section or the platform.

3. In submarine boat construction, the combination with a hull, of a projectile discharging section thereon, a projectile loading platform operating in the hull and movable to carry a projectile to the said discharging section, projectile carrying means, and supporting means on the platform and discharging section so arranged as to compel an operative connection of the projectile carrying means with either the supporting section or the platform.

4. In submarine boat construction, the combination with a hull, of a projectile discharging section thereon, a loading device elevatable within the hull to carry a projectile to said discharging section, a projectile discharging means associated therewith, and means to automatically render the said discharging means operative as an incident to relative movement of the projectile loading device and said discharging section.

5. In submarine boat construction, the combination with a hull, of a projectile discharging section thereon, a loading device elevatable within the hull to carry a projectile to said discharging section, a projectile discharging means associated therewith, means to automatically render the said discharging means operative as an incident to relative movement of the projectile loading device and said discharging section, locking means on the discharging section to prevent movement of the projectile discharging means, and means on the discharging section adapted to release said locking means.

6. In submarine boat construction, the combination with a hull embodying a projectile charging section, and an associated directable projectile discharging section, there being a wall separating the two sections equipped with an openable door, a projectile tube in the first named discharging section, and means whereby to force said tube into water-tight connection with said wall, and move the projectile in the tube through the door opening of said wall into the directable discharging section.

7. In submarine boat construction, the combination with a hull embodying a projectile charging section and an associated directable projectile discharging section, there being a wall separating the two sections equipped with an openable door, a projectable tube in the first named discharging section, means whereby to force said tube into water-tight connection with said wall and move the projectile in the tube through the door opening of said wall into the directable discharging section, a projectile discharging tube carried by the directable section aforesaid and adapted to receive the projectile when it is moved on to the directable section, and means to lock the first mentioned projectile tube in water-tight connection with said wall when so adjusted.

8. In submarine boat construction, the combination with a hull, embodying a projectile charging section, and an associated directable projectile discharging section, there being a wall separating the two sections equipped with an openable door, a projectile tube in the first named discharging section, means whereby to force said tube into water-tight connection with said wall and move the projectile in the tube through the door opening of said wall into the directable discharging section, the last mentioned moving means consisting of a piston adapted to operate longitudinally of said tube and to eject the projectile therefrom.

9. In submarine boat construction, the combination with a hull, of a turret thereon accessible from within the hull, means to project the turret from the hull and to withdraw said turret from its projected position, projectile discharging means in the turret, and means to set the turret for variable directional discharge action of said means both when the turret is withdrawn and projected.

10. In submarine boat construction, the combination with a hull, of a turret thereon accessible from within the hull, means to project the turret from the hull and to withdraw said turret from its projected position, projectile discharging means in the turret, and means to set the turret for variable directional discharge action of said means both when the turret is withdrawn and projected and during the process of its withdrawal or projection.

11. In submarine boat construction, the combination with a hull, of a turret thereon accessible from within the hull, means to project the turret from the hull and to withdraw said turret from its projected position, projectile discharging means in the turret, and means to set the turret for variable directional discharge action of said means both when the turret is withdrawn and projected and during the process of its withdrawal or projection, including devices for turning the turret at any time during its operation.

12. In submarine boat construction, the combination with a hull, of an adjustable projectile discharge section mounted thereon, means in said section to support a projectile, and means to load a projectile into said section operating between it and the hull and effective at all time in the use of the discharging section to supply the same.

13. In submarine boat construction, the combination with a hull, of a turret thereon accessible from within the hull, means to project the turret from the hull and to withdraw said turret from its projected position, projectile discharging means in the turret, means to revolve the turret for variable directional discharge action of said means, a projectile loading device operable to supply the turret discharge means comprising a loading platform, and means to elevate the platform into the turret, and to revolve the platform within the turret.

14. In submarine boat construction, the combination with a hull, of a turret thereon accessible from within the hull, means to raise and lower and revolve the turret, projectile holding means in the turret and normally arranged in the "line of fire" of the projectile to be carried thereby, a projectile loading platform for the turret, means to elevate the platform to supply a projectile to said holding means, and means to automatically revolve the platform according to the degree of rotative movement of the turret.

15. In submarine boat construction, the combination with a hull, of a turret thereon accessible from within the hull, means to revolve the turret, projectile holding means in the turret and normally arranged in the "line of fire" of the projectile to be carried thereby, a projectile loading platform for the turret, means to elevate the platform to supply a projectile to said holding means, and means to automatically revolve the platform according to the degree of rotative movement of the turret.

16. In submarine boat construction, the combination with a hull, of a turret thereon accessible from within the hull, means to revolve the turret, projectile holding means in the turret and normally arranged in the "line of fire" of the projectile to be carried thereby, a projectile loading platform for the turret, means to elevate the platform to supply a projectile to said holding means, and means to turn the platform automatically at a predetermined time during its elevating movement whereby to cause it to bring a projectile thereon into proper delivery position relatively to the said holding means aforesaid.

17. In submarine boat construction, the combination with a hull, of a turret thereon accessible from within the hull, means to revolve the turret, projectile holding means in the turret and normally arranged in the "line of fire" of the projectile to be carried thereby, a projectile loading platform for the turret, means to elevate the platform to supply a projectile to said holding means, means to turn the platform automatically at a predetermined time during its elevating movement whereby to cause it to bring a projectile thereon into proper delivery position relatively to the said holding means aforesaid, and means for thereafter lowering the platform and causing automatic return turning movement in order to bring it to its normal projectile receiving position.

18. In submarine boat construction, the combination with a hull, of a turret thereon accessible from within the hull, means to revolve the turret, a projectile loading platform for the turret, means to elevate the platform to supply a projectile to the turret for firing therefrom, and automatic means operable incident to the platform elevation action whereby to turn the platform to bring the projectile thereon to the proper position for discharge from the turret at whatever rotative adjustment the latter has assumed.

19. In submarine boat construction, the combination with a hull, of a turret thereon accessible from within the hull, means to revolve the turret, a projectile loading platform for the turret, means to elevate the platform to supply a projectile to the turret for firing therefrom, automatic means operable incident to the platform elevation action whereby to turn the platform to bring the projectile thereon to the proper position for discharge from the turret at whatever rotative adjustment the latter has assumed, and means to reverse the action of said elevating means whereby to lower the platform and to cause automatic action of the turning means during lowering of the platform whereby to restore the platform to its normal projectile receiving position in the hull.

20. In submarine boat construction, the combination with a hull, of a projectile discharging section thereon, means to revolve said section, a loading platform elevatable from the hull into the discharging section, and provisions whereby the platform may enter said section by direct vertical movement from the hull, and by combined vertical and rotative movements.

21. In submarine boat construction, the combination with a hull, of a projectile discharging section thereon, means to revolve said section, a loading platform elevatable from the hull into the discharging section, and provisions whereby vertically elevating movement of the platform may be caused, whereby when the platform approaches the discharging section its elevation is discontinued and rotation thereof is effected and whereby the rotation is stopped and further elevating movement compelled.

22. In submarine boat construction, the combination with a hull, of a projectile discharging section thereon, means to revolve said section, a loading platform elevatable from the hull into the discharging section, and provisions whereby vertical elevating movement of the platform may be caused, whereby when the platform approaches the discharging section its elevation is automatically discontinued and rotation thereof is effected, and whereby the rotation is automatically stopped and further elevating movement compelled.

23. In submarine boat construction, the combination with a hull, of a projectile discharging section thereon, means to revolve said section, a loading platform elevatable from the hull into the discharging section, provisions whereby vertical elevating movement of the platform may be caused, whereby when the platform approaches the discharging section its elevation is discontinued and rotation thereof is effected, and whereby the rotation is stopped and further elevating movement compelled, and means to cause said provisions to act to return the platform to the hull by reverse movements in the parts in which it reaches the discharging section.

24. In submarine boat construction, the combination with a hull, of a projectile discharging section thereon having a plurality of means for supporting projectiles for discharge, means to revolve said section, and means to independently engage with the supporting means of the said section at any point in its revolution.

25. In submarine boat construction, the combination with a hull, of a projectile discharging section thereon, projectile supporting means on said section, a loading platform to supply a projectile to the said section, and means to shift the projectile from the platform onto said supporting means, and means for operating the platform.

26. In submarine boat construction, the combination with a hull, of a projectile discharging section thereon, projectile supporting means on said section, a loading platform to supply a projectile to the said section, projectile tubes adapted to be carried by said platform, and means under manual control to raise and lower the platform and to transfer the said tubes back and forth relative to the said supporting means.

27. In combination with a hull, a turret adapted to be rotated and elevated, the turret being provided with discharge ports and torpedo tube supporting means in alinement with the ports, a support adapted for elevation into the turret and rotation within the same and adapted to carry a loaded torpedo tube whereby the tube may be attached to the turret in alinement with the discharge ports and means for effecting a water tight seal between the turret and the tube.

28. In a submarine boat construction, the combination of a hull, a torpedo charging section therein, a torpedo discharging section therein, means to pass the torpedo from the former to the latter section, and a loading platform in the hull and movable to carry torpedoes between a supply point and the charging section, and means to receive and support a torpedo in the charging section when carried thereto by the platform, and means for withdrawing the platform to the point of supply.

29. In a submarine boat construction, the combination of a hull, a torpedo charging section therein, a torpedo discharging section therein, means to pass the torpedo from the former to the latter section, and a loading platform in the hull and movable to carry torpedoes between a supply point and the charging section, and means to receive and support a torpedo in the charging section when carried thereto by the platform, and means for withdrawing the platform to the point of supply, combined with discharging means for the torpedo in the charging section, and means to render the discharging means effective when the platform reached a certain point in its movement.

In testimony whereof I affix my signature.

CHARLES H. WAGNER.